(12) United States Patent
Lundgren-Goodman et al.

(10) Patent No.: US 10,921,170 B2
(45) Date of Patent: Feb. 16, 2021

(54) ARRAY OF DIFFERENT TYPES OF METERING SCOOPS FOR DOSING A CONSUMER PRODUCT

(71) Applicant: Å&R Carton Lund Aktiebolag, Lund (SE)

(72) Inventors: Maximilian Lundgren-Goodman, Lomma (SE); Henrik Herlin, Kristianstad (SE); Mikael Carlsander, Lund (SE)

(73) Assignee: Å&R Carton Lund Aktiebolag

( * ) Notice: Subject to any disclaimer, the term of this patent is extended or adjusted under 35 U.S.C. 154(b) by 0 days.

(21) Appl. No.: 16/607,250

(22) PCT Filed: Apr. 24, 2018

(86) PCT No.: PCT/SE2018/050414
§ 371 (c)(1),
(2) Date: Oct. 22, 2019

(87) PCT Pub. No.: WO2018/199836
PCT Pub. Date: Nov. 1, 2018

(65) Prior Publication Data
US 2020/0333173 A1    Oct. 22, 2020

(30) Foreign Application Priority Data

Apr. 25, 2017    (SE) ........................... 1750497

(51) Int. Cl.
*G01F 19/00*    (2006.01)
(52) U.S. Cl.
CPC .................... *G01F 19/002* (2013.01)
(58) Field of Classification Search
CPC ..................................................... G01F 19/002
(Continued)

(56) References Cited

U.S. PATENT DOCUMENTS

| 1,694,119 A | * | 12/1928 | Frank | ..................... A47G 19/24 |
| | | | | 141/381 |
| 3,400,591 A | * | 9/1968 | Larson | .................. G01F 19/002 |
| | | | | 73/426 |

(Continued)

FOREIGN PATENT DOCUMENTS

| CN | 2577743 Y | 10/2003 |
| CN | 2670918 Y | 1/2005 |

(Continued)

OTHER PUBLICATIONS

Chinese Office Action including Search Report for Application No. 201880027206.X, dated Aug. 13, 2020, 8 pages.

(Continued)

*Primary Examiner* — Jamel E Williams
(74) *Attorney, Agent, or Firm* — Lerner, David, Littenberg, Krumholz & Mentlik, LLP

(57) ABSTRACT

The invention is related to an array of different types of scoops (10) comprising at least two types of scoops (11), each type of scoop (11', 11", 11''', 11'''') in the array (10) comprising: a scoop bowl (12) having a scoop capacity (12', 12"); and a handle (13) having a proximal end (16) connected to said scoop bowl (12), said handle (13) having a handle extension (13', 13") extending from said proximal end to a distal end (17) remote from said scoop bowl (12); and visually detectable identification means. Each type of scoop (11', 11", 11''', 11'''') in said array of different types of scoops differs from every other type of scoop (11', 11", 11''', 11'''') in said array of different types of scoops (10) by having a different scoop capacity (12', 12") and/or handle extension (13', 13"). The visually detectable identification means is a visually detectable identification element (18', 18", 18''', 18''''), wherein each type of scoop (11', 11", 11''', 11'''') in said array of different types of scoops (10) is provided with a unique visually detectable identification (Continued)

element (18', 18", 18''', 18""). The invention also relates to an array of different types of packaging containers (30) comprising at least two types of packaging containers (31) wherein each type of packaging container in the array (30) differs from every other type of packaging container (31) in said array (30) by one or more aspects such as different content, different size and different design. Each type of packaging container (31) in said array (30) is provided with a corresponding unique type of scoop (11) from said array of different types of scoops (10).

10 Claims, 6 Drawing Sheets

(58) Field of Classification Search
USPC .......................................................... 73/426
See application file for complete search history.

(56) References Cited

U.S. PATENT DOCUMENTS

| | | | | |
|---|---|---|---|---|
| 4,043,203 | A * | 8/1977 | Montesi | G01F 19/002 73/427 |
| 5,706,974 | A * | 1/1998 | Murdick | B65D 51/246 206/230 |
| 7,175,041 | B2 * | 2/2007 | Ekkert | B65D 51/246 206/541 |
| 8,215,167 | B2 * | 7/2012 | Hall | G01F 19/002 73/426 |
| 8,650,951 | B2 * | 2/2014 | Kern | G01F 19/002 73/426 |
| 8,678,198 | B1 * | 3/2014 | D'Andrea | B07B 1/02 209/417 |
| 9,476,749 | B1 * | 10/2016 | Wiggins | B65D 21/0233 |
| 9,541,441 | B2 * | 1/2017 | Prero | B65D 77/245 |
| 2002/0060220 | A1 * | 5/2002 | Torniainen | B65D 51/246 220/212 |
| 2003/0029868 | A1 * | 2/2003 | Davidov | B65D 51/246 220/212 |
| 2010/0089151 | A1 | 4/2010 | Mantilla et al. | |
| 2010/0326848 | A1 | 12/2010 | Mangin et al. | |
| 2016/0001941 | A1 * | 1/2016 | Crusius | B65B 7/28 220/212 |
| 2016/0030285 | A1 | 2/2016 | Miceli et al. | |
| 2017/0336237 | A1 * | 11/2017 | Nuijen | B65D 77/245 |
| 2019/0256261 | A1 * | 8/2019 | van Drecht | B65B 31/028 |
| 2019/0270558 | A1 * | 9/2019 | Pietraniec | B65D 77/245 |

FOREIGN PATENT DOCUMENTS

| | | |
|---|---|---|
| CN | 201481190 U | 5/2010 |
| CN | 201542476 U | 8/2010 |
| CN | 106536368 A | 3/2017 |
| JP | 2001012991 A | 1/2001 |
| JP | 2007263936 A | 10/2007 |
| WO | 2014129903 A1 | 8/2014 |
| WO | 2016078887 A1 | 5/2016 |

OTHER PUBLICATIONS

International Search Report from Application No. PCT/SE2018/050414 dated Jul. 13, 2018, pp. 1-7.

* cited by examiner

ARRAY OF DIFFERENT TYPES OF METERING SCOOPS FOR DOSING A CONSUMER PRODUCT

CROSS-REFERENCE TO RELATED APPLICATIONS

The present application is a national phase entry under 35 U.S.C. § 371 of International Application No. PCT/SE2018/050414, filed Apr. 24, 2018, which claims priority from Swedish Patent Application No. 1750497-8, filed Apr. 25, 2017, the disclosures of which are hereby incorporated herein by reference.

TECHNICAL FIELD

The present invention relates generally to metering scoops intended for dosing a consumer product from a packaging container, and in particular to a means for visually detecting and identifying such a metering scoop in an array of different types of metering scoops, and providing the correct type of metering scoop to a packaging container intended for a particular consumer product.

BACKGROUND OF THE INVENTION

A large number of consumer products is provided in powder or granulate form which is to be used in measured amounts from a packaging container or bag containing a larger amount of product for multiple uses. Such consumer products include e.g. infant formula, flour, coffee, sugar, and nutritional supplements, such as protein or dietary supplements. The powders or granulates need to be metered with a dosing scoop or other similar measuring tool for reasons of safety and in order to guarantee the right nutritional benefits. Such dosing tools are usually packed into the can for convenience, so that when the consumer needs to measure a dose of the product, it is easy to use the scoop provided. Moreover, the size of the scoop is very important since it is predetermined to suit the usage instructions provided with the product. Therefore, such a dosing scoop is often provided together with the product and the container by the manufacturer to avoid mis-dosage by the consumer.

During the filling and packing of consumer product into containers and bags it is important that the dosing scoop intended for a certain product is provided in the correct container containing the corresponding product. The filling and packing process is often an automated process performed by robots with a minimum of human intervention. It is therefore necessary for a robot to be able to identify a specific type of scoop intended for a particular product in an array of different types of scoops, and provide the correct type of scoop in the proper packaging container intended for that product. All types scoops in the array of different types of scoops normally have similar construction elements such as a scoop bowl and a handle, but differ by one or more features that may not be easily and immediately identified by a robot or a human being. Thus, it is an object of the invention to provide a means by which e.g. a robot in an automated packaging system may detect and identify a unique type of scoop in an array of different types of scoops and provide said type of scoop in the correct packaging container.

SUMMARY OF THE INVENTION

In a first aspect the above described object is achieved by an array of different types of scoops comprising at least two different types of scoops, each type of scoop in the array comprising a scoop bowl which has a scoop capacity and a handle having a proximal end connected to said scoop bowl. The handle has a handle extension extending from said proximal end to a distal end remote from said scoop bowl, and each scoop also has a visually detectable identification means. Each type of scoop in said array of different types of scoops differs from every other type of scoop in said array by having a different scoop capacity and/or handle extension. The visually detectable identification means is a visually detectable identification element, wherein each type of scoop in said array of different types of scoops is provided with a unique visually detectable identification element.

The array of different type of scoops comprises at least two types of scoops. This means that the array may comprise at least two single individual scoops that differ from each other in at least one aspect. However, in most cases the array comprises at least two types of scoops that differ from each other in at least one aspect, wherein each type of scoop may comprise two or more identical scoops. The array of different types of scoops may contain 3, 4, 5, 6, 7, 8, 9, 10, 15, 20 or more types of scoops and each type of scoop in the array of different types of scoops may contain comprise 10 or more identical scoops, such as 100, 200, 300, 400, 500, 600, 700, 800, 900 or 1000 or more identical scoops. Each type of scoop in the array has like scoop construction elements, such as each scoop having a scoop bowl, a scoop handle and a visually detectable identification means, but differ in at least one aspect such as scoop capacity and/or handle extension.

Each type of scoop in the array of different types of scoops has a scoop bowl with an open upper end and a closed lower end. Each scoop bowl also has a scoop capacity for dosing a desired amount of consumer product provided as powder, granulate or liquid. The open end of the scoop bowl may have different outlines, such as e.g. circular, oval, heart-shaped or rectangular, but all scoops in one array have the same open end outline.

Each type of scoop in the array of different types of scoops has a scoop handle with a proximal end at the scoop head, said handle having a handle extension extending from said proximal end to a distal end remote from said scoop bowl. The handle extends substantially in one plane and the scoop is preferably symmetrical around a longitudinal axis of the handle.

Each type of scoop of the array of different types of scoops is also provided with a visually detectable identification means which enables each type of scoop in the array to be visually identified and distinguished from every other type of scoop in the array.

Each type of scoop in said array of different types of scoops differs from every other type of scoop of said array by having a different scoop capacity and/or handle extension. This means that each type of scoop in the array of different types of scoops differs from every other type of scoop in the array.

The scoop capacity of the scoop bowl denotes the volume of scoopable content such as powder, granulate or liquid said scoop can hold, and the scoop capacity may be different for each type of scoop in the array of different types of scoops. The volume of scoopable content may vary depending on the type of product or dose to be scooped. Thus, in an array of different types of scoops comprising scoop types having at least two different scoop capacities, a first type of scoop in the array of different types of scoops may have a first scoop capacity and a second type of scoop in the array of different types of scoops may have a second scoop capacity, wherein the first scoop capacity is different from the second scoop capacity.

The handle extension of the scoops may differ between the types of scoops in the array. Thus, in an array of different types of scoops comprising scoop types having at least two different handle extensions, a first type of scoop in the array of different types of scoops may have a first handle extension and a second type of scoop in the array of different types of scoops may have a second handle extension, wherein the first handle extension is different from the second handle extension.

All types of scoops in the array of different types of scoops differ from each other by scoop capacity and/or handle extension. This means that an array of different types of scoops comprising two different scoop capacities and two different handle extensions the array may comprise one type of scoop having a first scoop capacity and a first handle extension, one type of scoop having a first scoop capacity and a second handle extension, one type of scoop having a second scoop capacity and a first handle extension, and one type of scoop having a second scoop capacity and a second handle extension. This array of scoops comprises four different types of scoops that all are different from each other in scope capacity and/or handle extension.

Each type of scoop in the array of different types of scoops is provided with a visually detectable identification means, such as a visually detectable identification element which is unique for each type of scoop in said array of different types of scoops. By a unique visually detectable identification element is implied a visually detectable identification element which can be visually distinguished from every other visually detectable identification element provided on the other types of scoops in the array. Each unique visually detectable identification element corresponds to and identifies a specific combination of scoop capacity and/or scoop handle length which is unique to the particular type of scoop in the array.

Advantageously, the visibly detectable identification element is arranged on the scoop bowl, such as on a bottom of the scoop bowl. The visibly detectable identification element may be provided on the inside of the scoop bowl or on the outside of the scoop bowl, or on both the inside and the outside of the scoop bowl. The visibly detectable identification element may also be arranged on the handle.

The visibly detectable identification element is chosen from the group consisting of one or more of apertures, raised elements or a combination thereof. Advantageously the visibly detectable identification element consists of one or more apertures.

The apertures may differ in size, design, and or number. The apertures may be of the same size on all scoops but vary in number and/or design between each type of scoop of the array. Alternatively, the design of the visually detectable identification element may vary such that it comprises apertures that differ in size and/or in numbers.

The visibly detectable identification element may also be one or more raised elements such as protrusions or knobs. The raised elements may differ in size, design, and or number. The raised elements may be of the same size on all scoops but vary in number and/or design between each type of scoop of the array. Alternatively, the design of the visually detectable identification element may vary such that it comprises raised elements that differ in size and/or in numbers.

The visibly detectable identification element may also be a combination of one or more apertures and one or more raised elements.

The visually detectable identification element is advantageously visually detectable and identifiable by a human such that a human being is able to identify and or distinguish between each scoop of the array by means of sight and/or touch. The visually detectable identification element is advantageously also detectable and identifiable by an automatic sorting and/or identification device, such that the device is capable to automatically detect, identify and distinguish between each type of scoop in the array of different types of scoops.

Automatic sorting and/or identification devices may be robots, cameras or other sensor devices configured to detect, identify and sort scoop types provided with their own unique visually detectable identification elements as disclosed herein, and distinguish them from every other type of scoop in the array, each of which also is provided with its own visually detectable identification element. The automatic sorting and/or identification device may thereafter also provide the identified scoop type to a corresponding packaging container.

Advantageously each scoop in said array of different type of scoops is arranged to be stacked together with one or more scoops of identical scoop type. The overall geometry of the scoops is advantageously designed to allow stacking of a plurality of identical scoops (i.e. scoops of the same type) in a space saving manner for transport and storage. Scoops of this kind which are intended for packaging together with scoopable contents inside a packaging container are also generally introduced into the packaging process in the form of a stack of identical scoops from which individual scoops are picked and placed in the containers. Advantageously the scoop bowl has a slightly conical shape to allow stacking of the scoops inside each other. Furthermore, to facilitate stacking of identical scoops in a space-saving manner the proximal end of the handle is provided with a stack stabilization arrangement wherein both longitudinal edges of the handle proximal to the scoop bowl are provided with a raised edge segment facing the closed end of the scoop bowl and a corresponding cut-in portion on the side of the handle facing the open end of the scoop bowl. The raised edge segment of a first scoop is configured to fit in the cut-in portion of a second scoop when forming a stack of two scoops or more. The stack stabilization arrangement allows stacking of scoops with planar handles inside each other and facilitates keeping the stack of scoops together in a shape stable manner, simplifying transport, storing and handling of the scoops in a packaging process. This means that the scoops can be stored and supplied to packaging machines in a stable stacked configuration which is advantageous for logistic reasons.

The overall geometry of the scoops is advantageously designed to also allow stacking of a plurality of identical scoops in alternating opposite directions.

In this embodiment, each scoop advantageously further comprises a first scoop retention member and a second scoop retention member. The first scoop retention member is arranged on a proximal end of the handle and the second scoop retention member is arranged on the distal end of the handle.

The first scoop retention member arranged on the proximal end of the handle of a first scoop is configured to connect with said second scoop retention member arranged on the distal end of the handle on a second scoop which is identical to said first scoop. Each scoop in a stack is identical to all other scoops in the same stack. This means that all scoops in one stack have the same scoop capacity, the same handle extension and identical visually detectable identification elements.

Advantageously the first retention member is a hole arranged on the proximal end of each handle between the two raised edge segments, and the second retention member is a protruding knob arranged on the distal end of the handle and being configured to mate with a first retention member. When the identical scoops are stacked together in alternating opposite directions, the protruding knob arranged on the distal end of the handle on a first scoop is configured to be arranged in a hole arranged on the proximal end of the handle on a second scoop. This arrangement further facilitates keeping the stack together and lines up the scoops in a space saving manner. In the embodiment using first and second scoop retention members, the stabilization arrangement with raised edge segments is optional.

All stacking provisions disclosed herein may be used independently of the visually detectable identification elements as disclosed herein.

The visually detectable identification elements are advantageously arranged on the scoop bowl such as at the bottom of the scoop bowl. Visually detectable identification elements placed at the bottom of the scoop bowl can be easily detected in a direction perpendicular to the opening in the scoop bowl both by ocular inspection and by detection equipment. Furthermore, apertures and/or protruding elements placed at the bottom of the scoop bowl may also serve to prevent the scoops in a stack of scoops from sticking together, thus facilitating separation of an individual scoop from a stack of scoops. The separation function is due to the apertures and/or protruding elements preventing a vacuum being formed when scoop bowls are stacked in a nesting manner inside one another.

In a further aspect the invention relates to an array of different types of packaging containers comprising at least two types of packaging containers. Each type of packaging container in said array of different types of packaging containers differs from every other type of packaging container in said array of different types of packaging containers by one or more aspects such as different content, different size and/or different design. Each type of packaging container in said array of different types of packaging containers is provided with a corresponding unique type of scoop from said array of different types of scoops.

The array of different types of packaging containers comprises at least two types of packaging containers. This means that the array may comprise at least two single individual packaging containers that have like packaging container construction elements, but that differ from one another in at least one aspect.

An array of packaging containers may also comprise at least two types of packaging containers, wherein each type of packaging container has like packaging container construction elements but differs from the other types in at least one aspect. Generally the array of different types of packaging containers may contain 3, 4, 5, 6, 7, 8, 9, 10, 15, 20 or more types of packaging containers, and each type of packaging containers in the array of different types of packaging containers may contain comprise 10 or more identical packaging containers, such as 100, 200, 300, 400, 500, 600, 700, 800, 900 or 1000 or more identical packaging containers.

Each type of packaging container in the array has like packaging container construction elements, such as each packaging container comprises a container wall extending from a container bottom to a container opening, and a closure arrangement comprising a lid. Each packaging container also comprises an interior compartment adapted to contain a scoopable consumer product arranged in the container body.

Each type of packaging container in the array of different types of packaging containers differ from every other type of packaging container in the array in at least one aspect such as different content, different size and different design. Each type of packaging container in said array of different types of packaging containers is provided with a corresponding unique type of scoop from said array of different types of scoops.

The content of the packaging containers in an array of different types of packaging containers may vary such that a first type of container in the array of different types of containers may contain a first type of consumer product and a second type of container may contain a second type of consumer product. Alternatively, each type of packaging container may contain the same consumer product but in different concentration ranges. The different contents may each require scoop types with different scoop capacities to meter the predetermined and desired amount of consumer product.

Thus a first type of packaging container is provided with a first type of scoop having a first scoop capacity to scoop a first type of consumer product. The second type of packaging container is provided with a second type of scoop having a second scoop capacity to scoop the second type of consumer product.

By way of example, the first type of container in the array may comprise a consumer product having a first concentration and a second type of container in the array may comprise the same consumer product having a second concentration. Different concentrations of consumer product may require different amounts of product to be scooped and therefore scoops of different scoop capacity have to be provided in the two different packaging containers. The first type of packaging container is provided with a first type of scoop having a first scoop capacity to scoop a consumer product having a first concentration. The second type of packaging container is provided with a second type of scoop having a second scoop capacity to scoop the consumer product having a second concentration.

Packaging containers in the array may have different sizes. A first type of packaging container may have a first size and a second type of packaging container in the array may have a second size which is different from the size of the first container. The first and second types of packaging containers may require scoops having different scoop capacity and/or handle extension to dose the appropriate amount of consumer product and/or to fit in a particular type of container. The first type of packaging container is provided with a first type of scoop having a first scoop capacity and/or handle length to scoop a consumer product from the first type of packaging container having a first size. The second type of packaging container is provided with a second type of scoop having a second scoop capacity and/or handle extension to scoop the consumer product from the second type of packaging container having a second size.

Packaging containers in the array may have different designs. A first type of packaging container may have a first design wherein the container walls are short. A second type of packaging container in the same array of different types of packaging containers may have a second design wherein the container walls are tall. A scoop having a short handle extension may suffice to reach the consumer product in the first type of packaging container with short walls, while a scoop having a long handle extension may be required to be able to scoop consumer product from the second type of packaging container having tall container walls. The first type of packaging container is provided with a first type of scoop having a short handle length to scoop a consumer product from the first type of packaging container having a short container walls. The second type of packaging container is provided with a second type of scoop having a long handle extension to scoop the consumer product from the second type of packaging container having tall container walls.

In a further aspect the invention relates to an apparatus for manufacturing and filling packaging containers with a consumer product. The apparatus comprises a detection and identification arrangement configured to detect and identify a unique type of scoop in an array of different types of scoops wherein each type of scoop in said array of different types of scoops is provided with a unique visually detectable identification element different from every other visually detectable identification element provided on every other scoop in said array of scoops. After having detected and identified the unique type of scoop the apparatus is arranged to provide said type of scoop in a unique type of packaging container differing from every other type of packaging containers in an array of different types of packaging containers.

The detection and identification arrangement may be a sensor arrangement capable of detecting and identifying the unique visually detectable identification element provided on each type of scoop in an array of different types of scoops, and thereafter match each scoop with a unique type of packaging container in an array of different types of packaging containers.

BRIEF DESCRIPTION OF THE DRAWINGS

The present invention will be described hereinafter by means of non-limiting examples and with reference to the appended drawings wherein.

DETAILED DESCRIPTION

Figure 2:
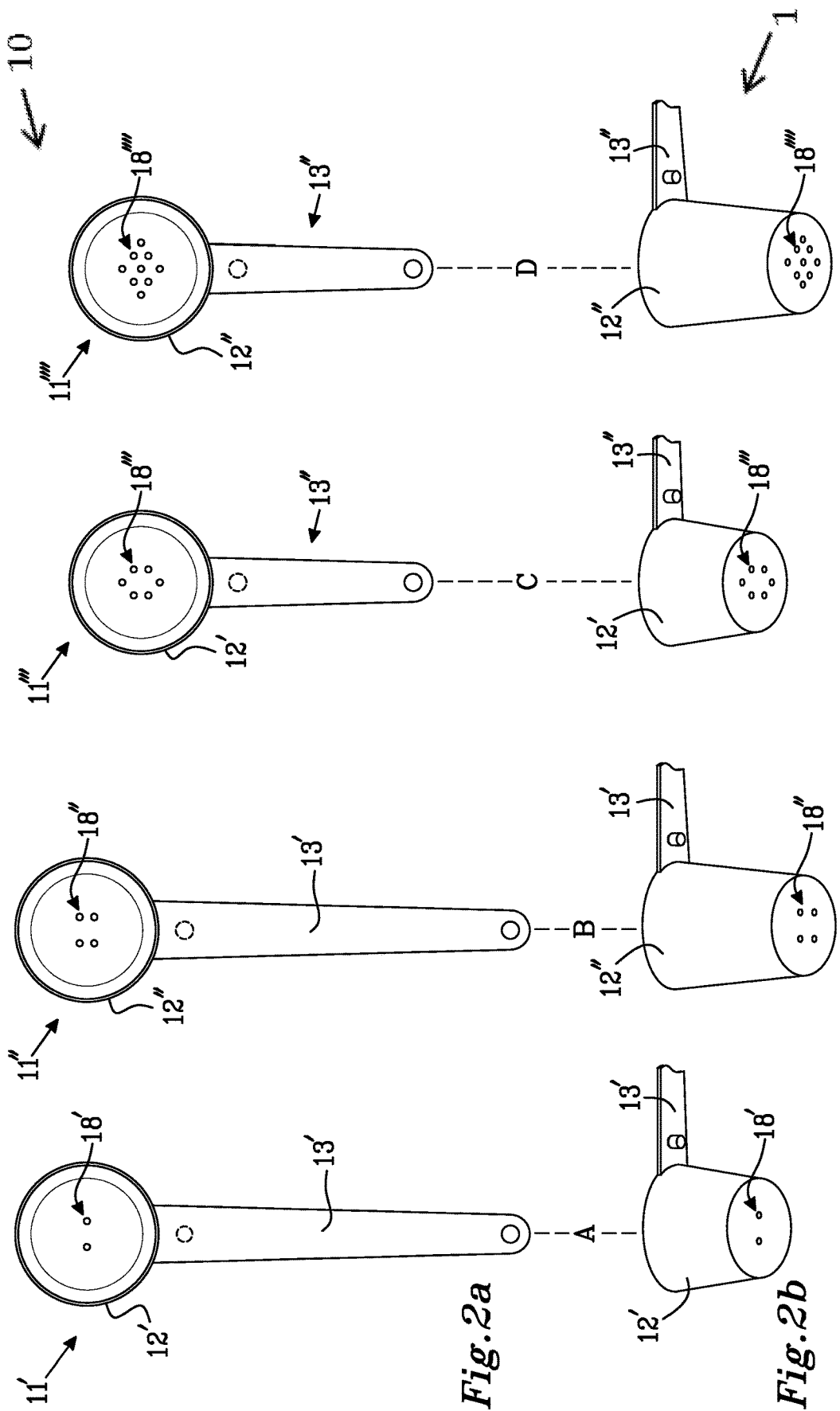
FIGS. 2a and b disclose an example of an array of different types of scoops according to the invention showing the array of different types of scoops from above (2a) and in a perspective side view (2b).

It is to be understood that the drawings are schematic and that individual components are not necessarily drawn to scale. The scoops and packaging containers shown in the figures are provided as examples only and should not be considered limiting to the invention. With reference to FIGS. 2a and 2b there is shown an array of different types of scoops 10 for dosing consumer products provided as powders and/or granulates. In some instances the products may also be provided as liquids.

The array of different types of scoops 10 as shown in FIGS. 2a and 2b comprises four types of scoops 11. For simplicity only one scoop 11 from each type of scoops in the array of different types of scoops 10 is shown in the figures. However, each type of scoop 11 in the array of different types of scoops 10 may comprise two or more identical scoops 11. Generally, the array of different types of scoops may contain 3, 4, 5, 6, 7, 8, 9, 10, 15, 20 or more types of scoops and each type of scoop 11 in the array 10 may comprise 10 or more identical scoops 11, such as 100, 200, 300, 400, 500, 600, 700, 800, 900 or 1000 or more identical scoops 11.

Figure 1:
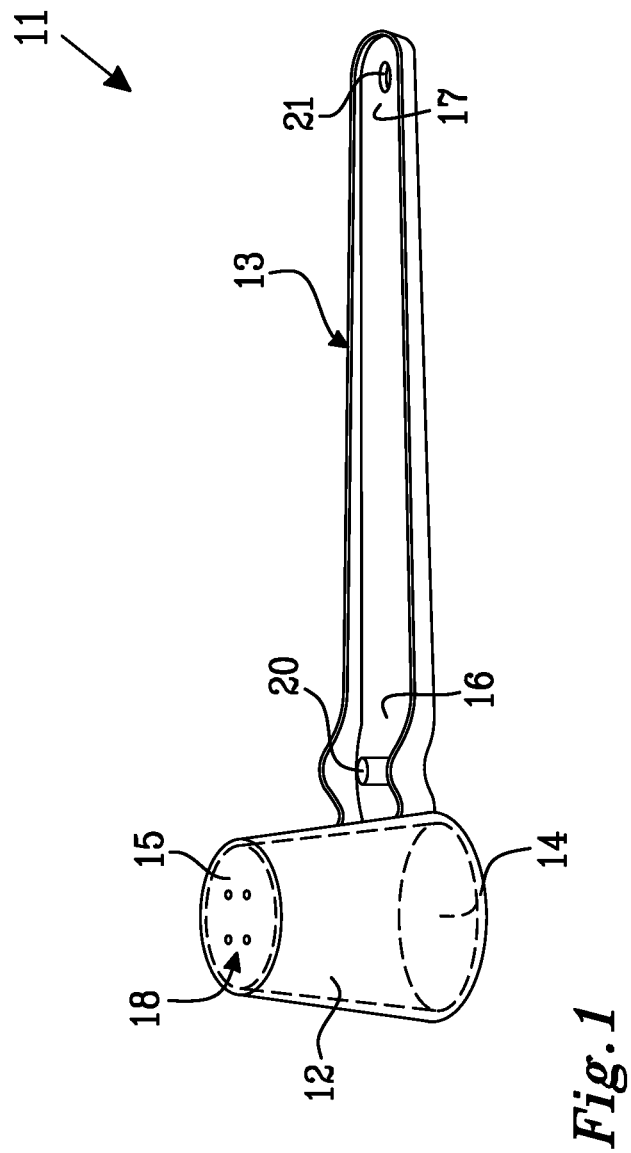
FIG. 1 is a perspective view of a scoop according to the invention.

As shown in FIGS. 1, 2a and 2b each scoop 11 (or type of scoop) in the array 10 has like scoop construction elements, such as a scoop bowl 12, a scoop handle 13 and a visually detectable identification means, but each type of scoop 11 in the array 10 differs in at least one aspect such as scoop capacity and/or handle extension.

Each scoop 11 in the array of different types of scoops 10 has a scoop bowl 12 with an open upper end 14 and a closed lower end 15 (see FIG. 1). The scoop bowl 12 may also include measurement markings (not shown) to assist the user in determining how much product that is held in the scoop bowl 12. The open end outline 14 of the scoop bowls 12 in the array of different types of scoops 10 shown in FIGS. 2a and 2b is circular, but the outline of the scoop bowl 12 open ends 14 may have any suitable configuration such as oval, heart-shaped, rectangular or polygonal. However all types of scoops 11 in one array 10 have the same open end outline 14. Advantageously the scoop bowl 12 has a slightly conical shape to allow stacking of the scoops 11 inside each other.

The scoop bowl 12 has a scoop capacity for dosing a desired amount of consumer product provided as powder, granulate or liquid. The scoop capacity corresponds to the predetermined volume of a specific consumer product to be metered from the specific type of packaging container by the user. The array of different types of scoops 10 as shown in FIGS. 2a and 21b comprises scoop types 11 having two different scoop bowl capacities 12' and 12", Scoops of type A and C have smaller scoop capacities 12' than scoops of type B and D (12").

Each type of scoop 11 in the array of different types of scoops 10 has a scoop handle 13 with a proximal end 16 arranged at the scoop bowl 12 (see FIG. 1). The handle 13 has a handle extension extending from said proximal end 16 to a distal end 17 remote from said scoop bowl 12. The array of different types of scoops 10 disclosed in FIGS. 2a and 2b comprises scoop types 11 with two different handle extensions 13' and 13". Scoops of type A and B have a longer handle extension (13') than scoops of type C and D (13").

Regardless of the handle extension length, the handle 13 extends substantially in one plane and the scoop 11 is preferably symmetrical around a longitudinal axis of the handle. This overall geometry has been found to provide an efficient and easy handling for the user of the scoop 11. This is also advantageous in regard to the manufacturing of the scoop 11 by injection molding as a symmetrical shape makes it easier to avoid deformation of the scoops 11 due to stresses in the manufacturing process. More preferably this overall geometry allows advantageous and space saving stacking of a plurality of identical scoops 11 which facilitates storage and handling of the scoops 11 until they are provided into corresponding packaging containers 31 manually or by a sorting device.

Each type of scoop 11 of the array of different types of scoops 10 is also provided with a visually detectable identification means which enables each type of scoop 11 in the array 10 to be visually identified and distinguished from every other type of scoop 11 in the array 10. The visually detectable identification means is advantageously a visually detectable identification element 18 which is unique for each type of scoop 11 in said array of different types of scoops 10 (see FIGS. 1, 2*a* and 2*b*).

By a unique visually detectable identification element 18 is implied a visually detectable identification element 18 which can be visually distinguished from every other visually detectable identification element 18 provided on the other types of scoops 11 in the array 10. Each unique visually detectable identification element 18 corresponds to and identifies a specific combination of scoop capacity and/or scoop handle length which is unique to the particular type of scoop 11 in the array 10.

The visibly detectable identification element 18 is chosen from the group consisting of one or more of apertures, raised elements or a combination thereof. Advantageously the visibly detectable identification element 18 is arranged on the scoop bowl 12, such as on the inside or outside bottom of the scoop bowl 12, or on both the inside and outside of the scoop bowl 12. However, the visibly detectable identification element 18 may also be arranged on the handle 13.

As seen in FIGS. 2*a* and 2*b* the visibly detectable identification element 18 consists of one or more apertures arranged in different designs on the bottom of the scoop bowls. Each type of scoop 11', 11", 11''', 11'''' in the array of different types of scoops 10 shown in FIGS. 2*a* and 2*b* contains a unique visibly detectable identification element 18', 18", 18''' and 18'''' which identifies a type of scoop 11 having unique specific combination of scoop capacity and/or handle extension. For example, scoops of type A contains a scoop bowl 12 with a small scoop capacity 12' and a long handle extension 13' and is identified by the visibly detectable identification element 18' having two apertures arranged at the bottom of the scoop bowl 12. This means that all scoops 11' in the array of different types of scoops 10 having two apertures arranged in this design are identical to scoops of type A, and contain a scoop bowl 12 with a small scoop capacity 12' and a long handle extension 13'.

Scoops of type B contains a scoop bowl 12 with a large scoop capacity 12" and a long handle extension 13' and is identified by the visibly detectable identification element 18" having four apertures arranged at the bottom of the scoop bowl 12. This means that all scoops 11" in the array of different types of scoops 10 having four apertures arranged in this design are identical to scoops of type B, and contain a scoop bowl 12 with a large scoop capacity 12" and a long handle extension 13'.

Scoops of type C contains a scoop bowl 12 with a small scoop capacity 12' and a short handle extension 13" and is identified by the visibly detectable identification element 18''' having six apertures arranged at the bottom of the scoop bowl 12. This means that all scoops 11''' in the array of different types of scoops 10 having six apertures arranged in this design are identical to scoops of type C, and contain a scoop bowl 12 with a small scoop capacity 12' and a short handle extension 13".

Scoops of type D contains a scoop bowl 12 with a large scoop capacity 12" and a short handle extension 13" and is identified by the visibly detectable identification element 18'''' having nine apertures arranged at the bottom of the scoop bowl 12. This means that all scoops 11'''' in the array of different types of scoops 10 having nine apertures arranged in this design are identical to scoops of type D, and contain a scoop bowl 12 with a large scoop capacity 12" and a short handle extension 13".

The apertures of the visibly detectable identification element 18 may differ in size, design, and/or number. The apertures may be of the same size on all types of scoops but vary in number and/or design between each type of scoop 11 of the array of different types of scoops 10 (as in FIGS. 2*a* and 2*b*). Alternatively, the design of the visually detectable identification element 18 may vary such that it comprises apertures that differ in size, shape and/or in numbers. For example, apertures can be elongated slots but it is important that the apertures are small enough to retain material that is scooped out of the packaging container by the scoop 11.

The visibly detectable identification element 18 may also be one or more raised elements such as protrusions or knobs (not shown). The raised elements may differ in size, design, and/or in number. The raised elements may be of the same size on all types of scoops 11 but vary in number and/or design between each type of scoop 11 of the array 10. Alternatively, the design of the visually detectable identification element 18 may vary such that it comprises raised elements that differ in size and/or numbers. The visibly detectable identification element 18 may also be a combination of one or more apertures and one or raised elements.

The visually detectable identification element 18 is generally visually detectable and identifiable by a human such that a human being is able to identify and or distinguish between each type of scoop 11 of the array 10 by means of sight and/or touch. Preferably the visually detectable identification element 18 is also detectable and identifiable by an automatic sorting device comprising a detection and identification arrangement, such that the device is capable to automatically detect, identify and distinguish between each type of scoop 11 in the array of different types of scoops 10.

Figure 3:
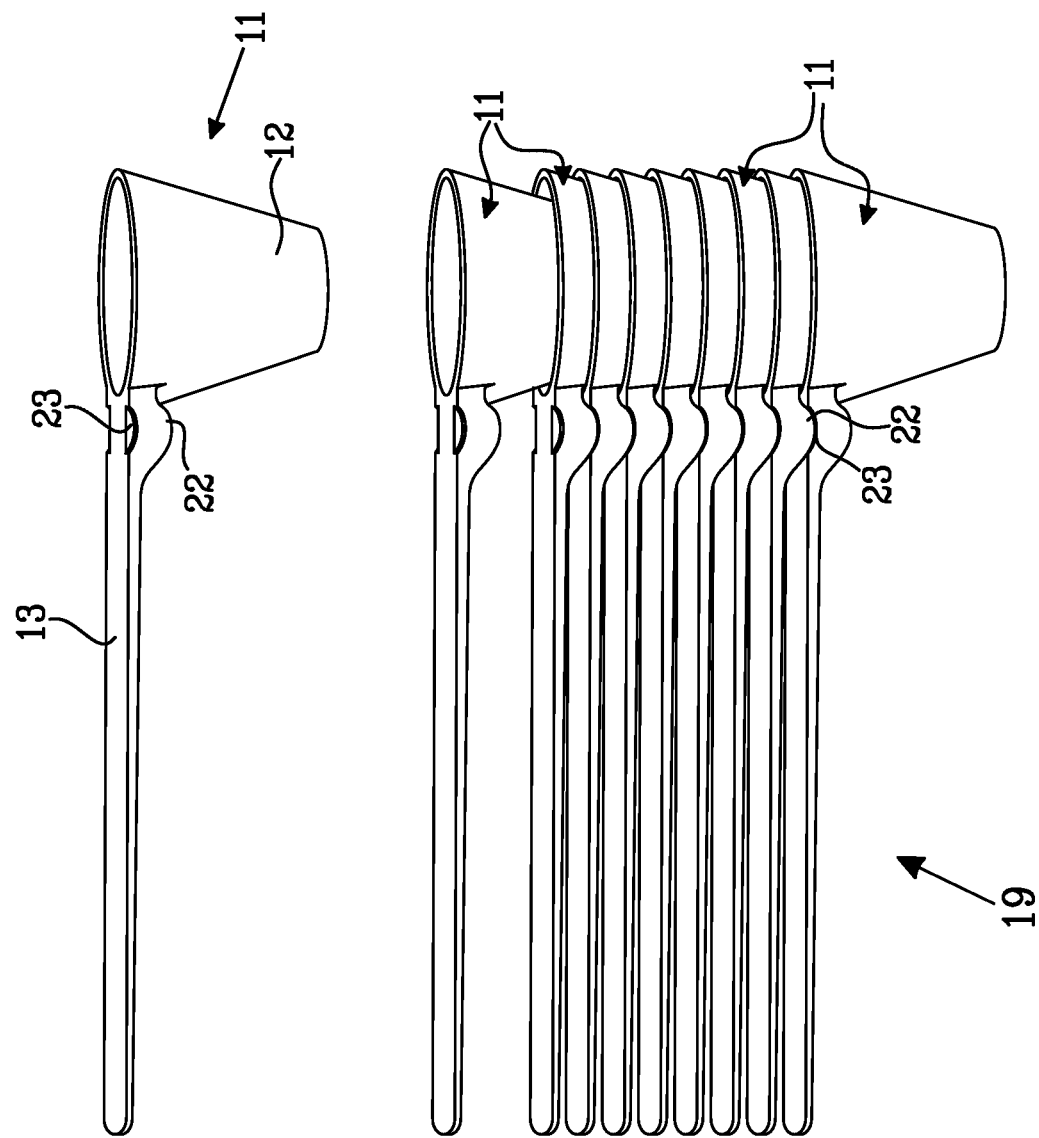
FIG. 3 shows a stack of scoops with planar handles stacked in same direction.
Figure 4:
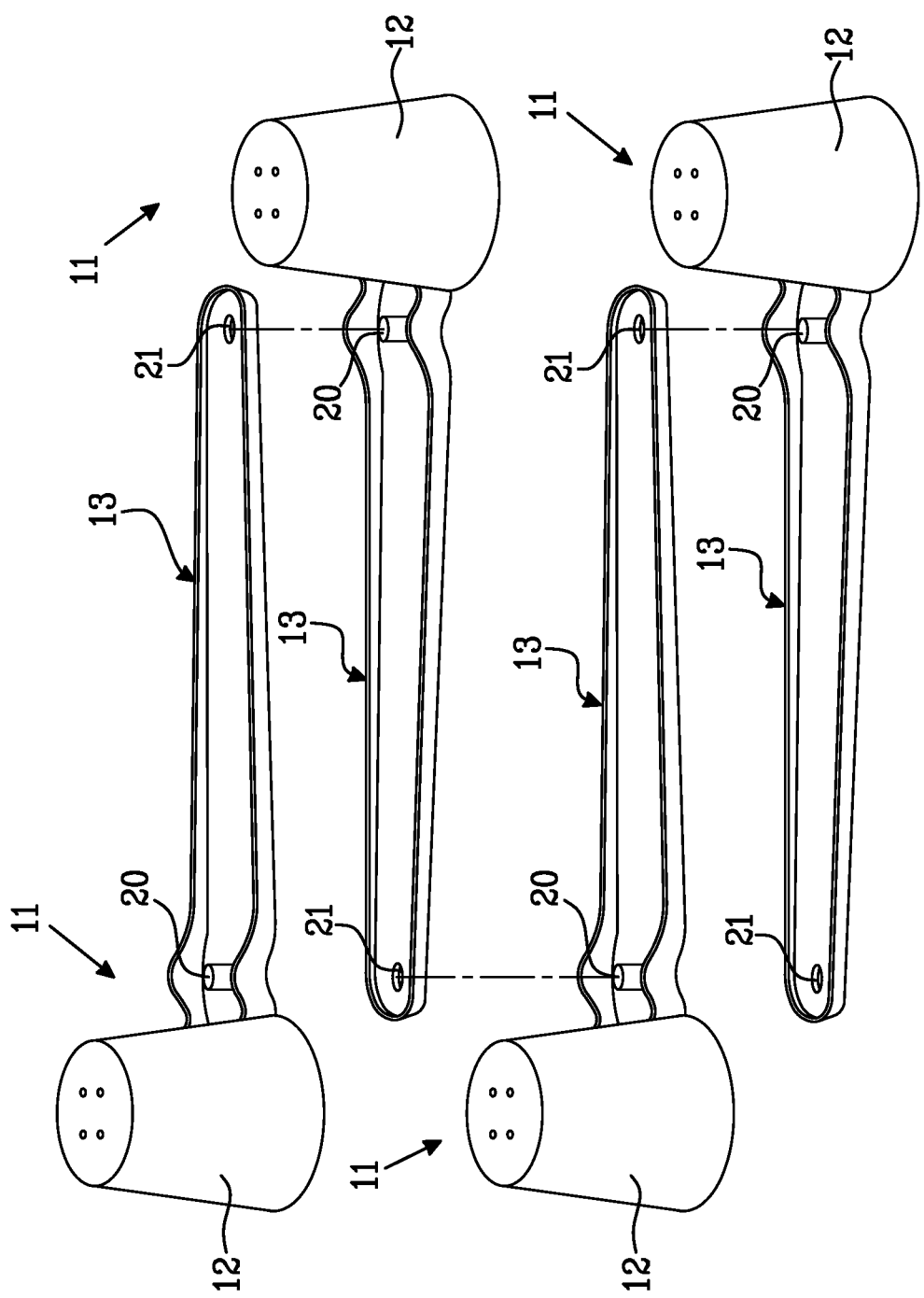
FIG. 4 shows a detailed view of a stack of scoops.
Figure 5:
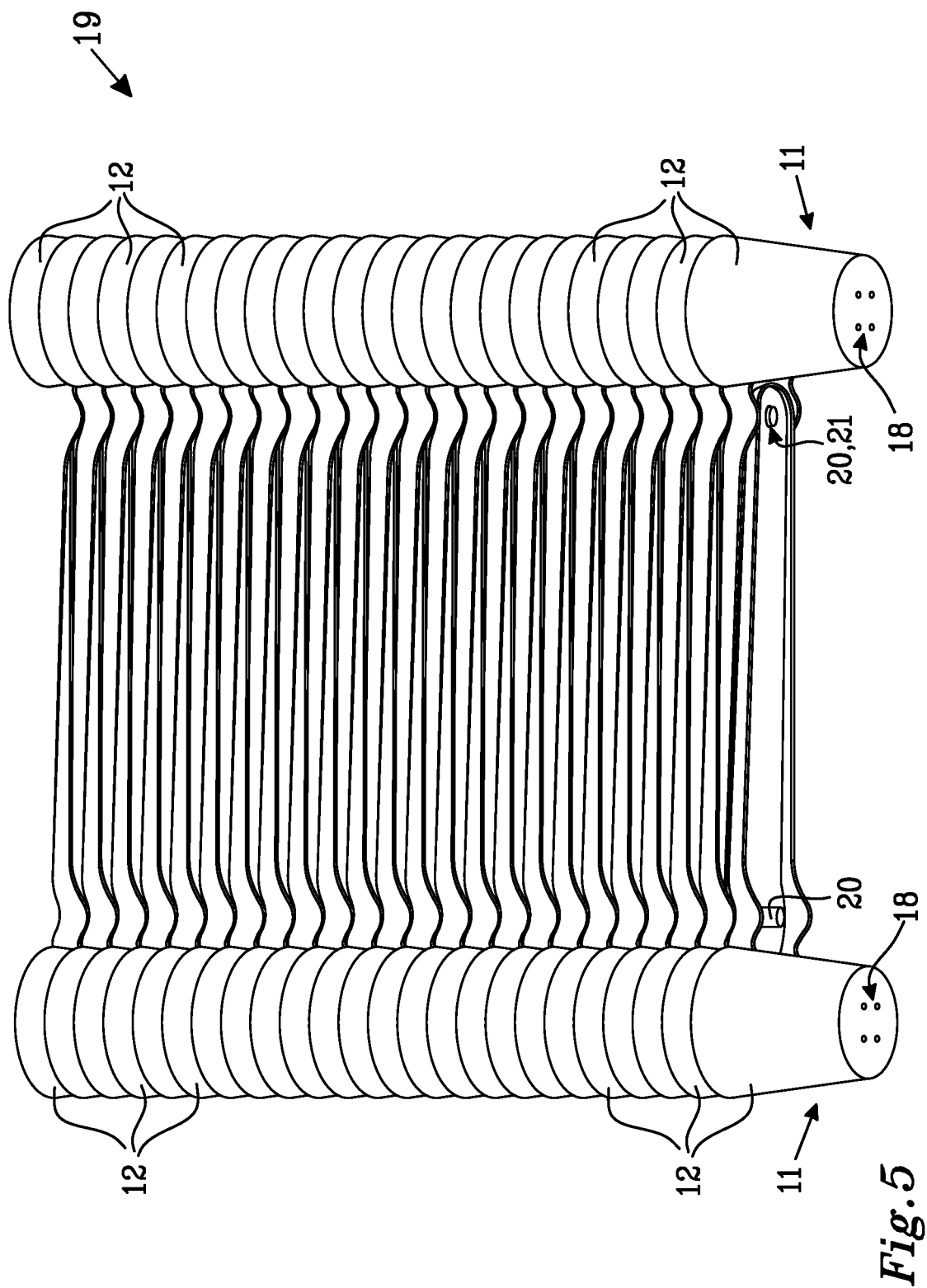
FIG. 5 shows a stack of scoops stacked in alternating opposite directions.

Advantageously each type of scoop 11 in said array of different types of scoops 10 has an overall design which allows them to be stacked together into a stack of scoops 19 with one or more identical scoops 11 of the same type in a space saving manner. FIGS. 3, 4, and 5 show how the overall geometry of the scoops 11 in the array of different types of scoops 10 has an advantageous design to allow stacking of a plurality of identical scoops 11 inside each other.

Advantageously the scoop bowl 12 has a slightly conical shape to allow stacking of identical scoops 11 with the scoop bowls 12 nesting inside each other (see FIG. 3). Furthermore, to facilitate stacking of scoops 11 with planar handles 13 the proximal end 16 of the handle 13 is provided with a stack stabilization arrangement. Both longitudinal edges of the handle 13 proximal to the scoop bowl 12 are provided with a raised edge segment 22 facing the closed lower end 15 of the scoop bowl 12, and a corresponding cut-in portion 23 on each side of the handle edge facing the upper open end 14 of the scoop bowl 12. The raised edge segment 22 of a first scoop 11 is configured to fit in the cut-in portion 23 of a second scoop 11 when forming a stack 19 of two scoops 11 or more. The stack stabilization arrangement allows stacking of scoops 11 with planar handles 13 inside each other and facilitates keeping the stack 19 of scoops together, simplifying storing and handling of the scoops 11.

In an advantageous embodiment the scoops 11 may also be stacked in alternating opposite directions (see FIGS. 4 and 5). This is enabled by the handle 13 extending substantially in a plane and having a shape that tapers from the proximal end 16 close to the scoop bowl 12 towards the distal end 17. Furthermore the scoop bowl 12 has an overall conical geometry that allows such stacking of a plurality of identical scoops 11. This enables the scoops 12 of each different type of scoop in an array of scoops to be formed into a stack and stored in a space saving manner and supplied to packaging machines in a stacked configuration which is advantageous for logistic reasons.

To facilitate the stacking of identical scoops 11 and retaining them stacked in this alternating opposite direction, each scoop 11 of each type of scoop in said array of different types of scoops 10 further advantageously comprises a first scoop retention member 20 and a second scoop retention member 21 (see FIG. 4). The first scoop retention member 20 is arranged on a proximal end 16 of the handle 13 and the second scoop retention member 21 is arranged on the distal end 17 of the handle 13. As seen in the FIGS. 4 and 5 the first retention member 20 is a hole arranged on the proximal end 16 of each handle 13, and the second retention member 21 is a protruding knob arranged on the distal end 17 of the handle 13. When the scoops 11 are stacked together in alternating opposite directions, the protruding knob arranged on the distal end 17 of the handle 13 on a first scoop is configured to be engaged in a hole arranged on the proximal end 16 of the handle 13 on a second scoop 11. This arrangement facilitates keeping the stack together and lines up the scoops 11 in a space saving manner.

The scoops in FIGS. 4 and 5 are shown with a stack stabilization arrangement of the same type stabilization arrangement in FIG. 3. It is to be understood that the stack stabilization arrangement is optional in the FIGS. 4 and 5 embodiment.

Each scoop 11 in the stack 19 is identical to all other scoops 11 in the same stack 19. This means that all scoops 11 in one stack 19 have the same scoop capacity, the same handle extension and identical visually detectable identification elements 18.

A further advantage of having the visually detectable identification elements 18 arranged on the scoop bowl 12 is that the apertures and/or protruding elements facilitate separating an individual scoop 11 from a stack 19 of scoops 11. The apertures and/or protruding elements will prevent a vacuum being formed when scoop bowls 12 are stacked inside one another.

Each type of scoop 11 in the array of different types of scoops 10 is intended to be identified by means of its unique visually detectable identification element 18 and provided into a corresponding unique type of packaging container 31.

Figure 6:
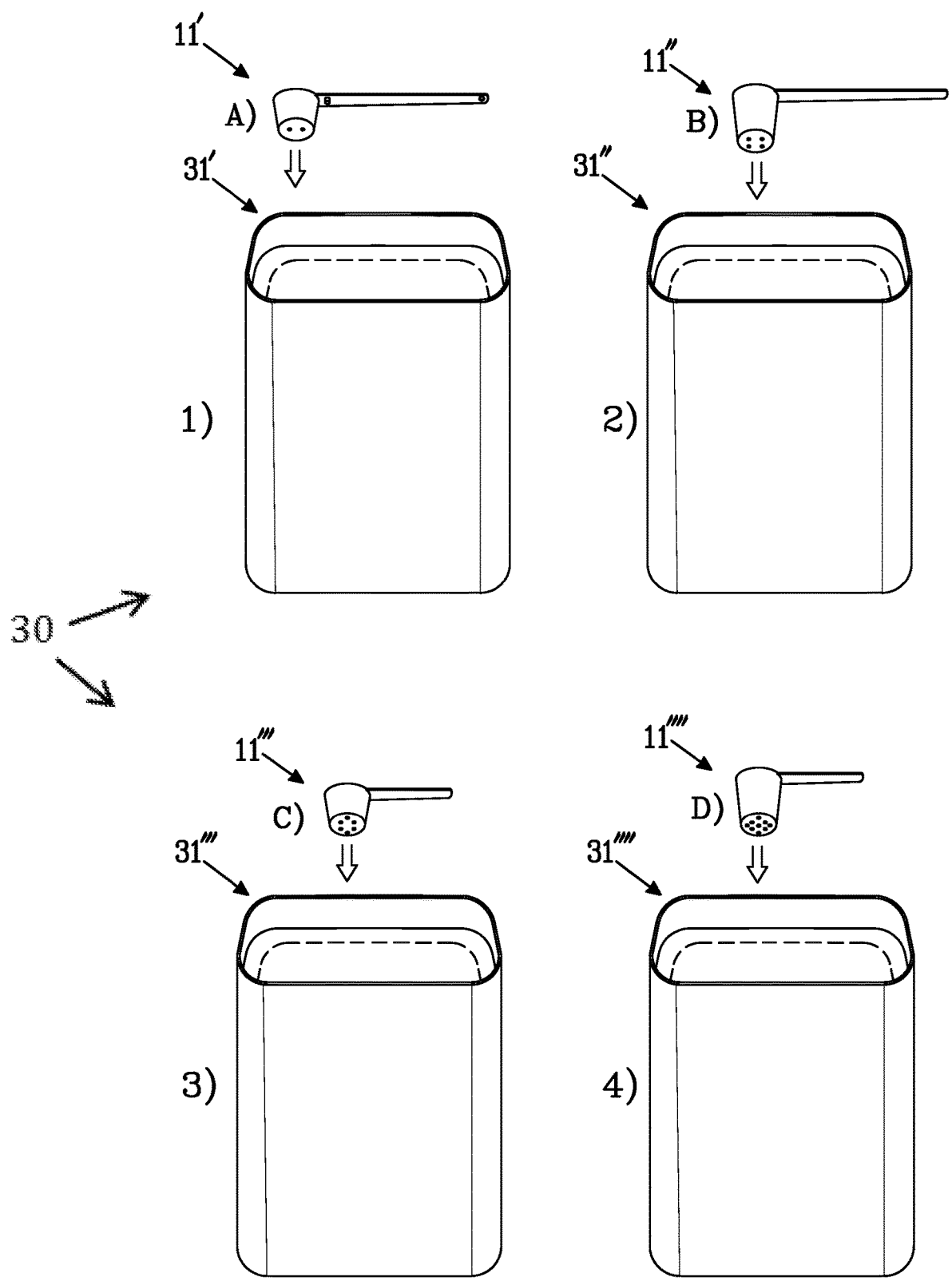
FIG. 6 shows an array of different type of packaging containers with corresponding scoops from an array of different types of scoops.

FIG. 6 discloses an array of different types of packaging containers 31 comprising four different types of packaging containers 31. Each type of packaging container 31 in said array of different types of packaging containers 30 differs from every other type of packaging container 31 in said array of different types of packaging containers 30 by one or more aspects such as different content, different size and/or different design. Each type of packaging container 31 in said array of different types of packaging containers 30 is provided with a corresponding unique type of scoop 11 from said array of different types of scoops 10.

The array of different types of packaging containers 30 as shown in FIG. 6 comprises four types of packaging containers 31. For simplicity only one packaging container 31 from each type of packaging containers 31 in the array of different types of packaging containers 30 is shown. However, each type of packaging container 31 in the array of different types of packaging containers 30 may comprise two or more identical packaging containers 31. Generally the array of different types of packaging containers 31 may contain 3, 4, 5, 6, 7, 8, 9, 10, 15, 20 or more types of packaging containers, and each type of packaging container 31 in the array 30 may comprise 10 or more identical packaging containers 31, such as 100, 200, 300, 400, 500, 600, 700, 800, 900 or 1000 or more identical packaging containers 31.

As can be seen in FIG. 6 each packaging container 31 (or type of packaging container) in the array 30 has like packaging container elements, such as a container wall extending from a container bottom to a container opening, and a closure arrangement comprising a lid (not shown). Each type of packaging container also comprises an interior compartment adapted to contain a scoopable consumer product arranged inside the container body. Advantageously, the container opening may be provided with a protective foil to protect the consumer product contained in the container interior.

However, each type of packaging container 31 in the array of different types of packaging containers 30 differs from every other type of packaging container 31 in the array 30 in at least one aspect such as by having a different content, a different size, a different design, etc. An array of packaging containers may be constituted by a range of differently sized containers of generally the same design and containing different amounts of the same product. It is also known to offer a range of containers having different contents, wherein the contents may be related in kind but differ in properties such as flavor, color, ingredients, etc. By way of example an array of different types of packaging containers may be provided for different kinds of tea, different kinds of coffee, different kinds of tobacco, different kinds of flour, etc. In FIG. 6 each type of packaging container in the array of different types of packaging containers 30 has a different content. Packaging container of type no. 1 has a first content, packaging container of type no. 2 has a second content, packaging container of type no. 3 has a third content, and packaging container of type no. 4 has a fourth content. The different types of consumer product may require scoops 11 of different scoop capacity and/or handle length to meter the different types of consumer product. Each type of packaging container 31 in the array of different types of packaging containers 30 is provided with a corresponding unique type of scoop 11 from said array of different types of scoops 10 that suits the unique properties of the content in the corresponding type of packaging container 31.

Packaging container type no. 1 is provided with scoop type A having a small scoop capacity 12' with a long handle extension 13' and which is marked with the visibly detectable identification element 18' having two apertures to scoop a first type of consumer product. Packaging container type no. 2 is provided with scoop type B having a large scoop capacity 12' and a long handle extension 13', and which is marked with the visibly detectable identification element 18" having four apertures to scoop the second type of consumer product. Packaging container type no. 3 is provided with scoop type C having a small scoop capacity 12' and a short handle extension 13", and which is marked with the visibly detectable identification element 18'" having six apertures to scoop a third type of consumer product. Packaging container type no. 4 is provided with scoop type D having a large scoop capacity 12" and a short handle extension 13", and which is marked with the visibly detectable identification element 18"" having nine apertures to scoop a fourth type of consumer product.

As set out herein, packaging container types in the array of different types of packaging containers may also differ in size (not shown). A first type of packaging container may have a first size and a second type of packaging container in the array may have a second size which is different from the size of the first container. The first and second types of packaging container may require scoops having different scoop capacity and/or handle extension to dose the appropriate amount of consumer product. The first type of packaging container may e.g. be provided with a first type of scoop having a first scoop capacity and/or handle length to scoop a consumer product from the first type of packaging container having a first size. The second type of packaging container may be provided with a second type of scoop having a second scoop capacity and/or handle extension to scoop the consumer product from the second type of packaging container having a second size.

Packaging containers in the array may have different designs (not shown). A first type of packaging container may have a first design wherein the container walls are short. A second type of packaging container in the same array of different types of packaging containers may have a second design wherein the container walls are tall. A scoop having a short handle extension may suffice to reach the consumer product in the packaging container with short walls, while a scoop having a long handle extension may be required to be able to scoop consumer product from a packaging container having tall container walls. The first type of packaging container is provided with a first type of scoop having a short handle length to scoop a consumer product from the first type of packaging container having a short container walls. The second type of packaging container is provided with a second type of scoop having a long handle extension to scoop the consumer product from the second type of packaging container having tall container walls.

As set out herein, in a process for introducing scoops in a container during a packaging of contents in the container, the visually detectable identification means is used to match an appropriate type of scoop from an array of scoops with a corresponding type of packaging container in an array of packaging containers. In a packaging machine, the scoops are generally introduced into the process from a stack of identical scoops, i.e. a stack of scoops of the same type, as set out herein. Accordingly, it is highly advantageous to be able to visually confirm, either by an operator or automatically by identification equipment in the machine, that a stack of the correct kind of scoops is loaded into the packaging machine. When producing and filling packaging containers, the packaging line produces a single type of packaging container in each run, thus requiring a single type of scoop to be introduced in the process.

The invention claimed is:

1. An array of different types of scoops comprising at least two different types scoops, each type of scoop in the array comprising:
   a scoop bowl having a scoop capacity; and
   a handle having a proximal end connected to said scoop bowl, said handle having a handle extension extending from said proximal end to a distal end remote from said scoop bowl; and
   visually detectable identification means;
   each type of scoop in said array of different types of scoops differing from every other type of scoop in said array of different types of scoops by having a different scoop capacity and/or handle extension,
   said visually detectable identification means is a visually detectable identification element, characterized in that each type of scoop in said array of different types of scoops is provided with a unique visually detectable identification element chosen from the group consisting of one or more of apertures or a combination of one or more of apertures and raised elements, each type of scoop in said array of different types of scoops being arranged to be stacked together with one or more scoops of the same type of scoops and having the identical unique visually detectable identification element.

2. The array of different types of scoops according to claim 1, characterized in that the visibly detectable identification element is arranged on the scoop bowl, such as on a bottom of the scoop bowl.

3. The array of different types of scoops according to claim 1, characterized in that the visibly detectable identification element is arranged on the handle.

4. The array of different types of scoops according to claim 1, characterized in that the visibly detectable identification element consists of one or more apertures.

5. The array of different types of scoops according to claim 1, characterized in that the proximal end of the handle is provided with a stack stabilization arrangement wherein a raised edge segment of a first scoop is configured to fit in a cut-in portion of a second scoop when forming a stack of two scoops or more.

6. The array of different types of scoops according to claim 1, characterized in that a scoop in said array of different types of scoops further comprises a first scoop retention member and a second scoop retention member.

7. The array of different types of scoops according to claim 6, characterized in that the first scoop retention member is arranged on a proximal end of the handle and the second scoop retention member is arranged on the distal end of the handle.

8. The array of different types of scoops according to claim 7, characterized in that said first scoop retention member arranged on the proximal end of the handle of a first scoop, is configured to connect with said second scoop retention member arranged on the distal end of the handle on a second scoop which is identical to said first scoop when forming a stack of two scoops or more.

9. An array of different types of packaging containers comprising at least two different types of packaging containers, each type of packaging container in said array of different types of packaging containers differing from every other type of packaging container in said array of different types of packaging containers by one or more aspects such as different content, different size and different design, characterized in that each type of packaging container in said array of different types of packaging containers is provided with a corresponding unique type of scoop from said array of different types of scoops according to claim 1.

10. An apparatus for manufacturing and filling packaging containers with a consumer product and comprising a detection and identification arrangement, characterized in that said detection and identification arrangement is configured to detect and identify a unique type of scoop in an array of different types of scoops, wherein each type of scoop in said array of different types of scoops is provided with a unique visually detectable identification element chosen from the group consisting of one or more of apertures, or a combination of one or more of apertures and raised elements and being different from every other visually detectable identification element provided on every other type of scoop in said array of different types of scoops, and providing said unique type of scoop in a unique type of packaging container differing from every other type of packaging containers in an array of different types of packaging containers.

* * * * *